United States Patent
Giordano

(10) Patent No.: US 6,819,992 B1
(45) Date of Patent: Nov. 16, 2004

(54) VEHICLE SAFETY ARRANGEMENT

(75) Inventor: Francois Giordano, Paris (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 10/089,785

(22) PCT Filed: Oct. 5, 2000

(86) PCT No.: PCT/SE00/01920

§ 371 (c)(1),
(2), (4) Date: Jul. 25, 2002

(87) PCT Pub. No.: WO01/25057

PCT Pub. Date: Apr. 12, 2001

(30) Foreign Application Priority Data

Oct. 5, 1999 (GB) .............................. 9923527

(51) Int. Cl.$^7$ ......................... B60R 22/00; B60R 21/32; E05F 15/00; G05D 1/00
(52) U.S. Cl. ........................... 701/45; 701/47; 340/436; 180/282; 280/735
(58) Field of Search .................... 701/45, 47; 340/436; 180/282; 280/735

(56) References Cited

U.S. PATENT DOCUMENTS

| 4,956,842 A | | 9/1990 | Said ........................... 371/62 |
| 5,176,214 A | * | 1/1993 | Taufer et al. ................ 180/268 |
| 5,283,472 A | * | 2/1994 | Takeuchi et al. ............ 307/10.1 |
| 5,359,515 A | * | 10/1994 | Weller et al. ................. 701/45 |
| 5,381,334 A | | 1/1995 | Furui .................... 364/424.03 |
| 5,602,736 A | * | 2/1997 | Toya et al. .................... 701/45 |
| 5,606,671 A | | 2/1997 | Wadsworth et al. ......... 395/286 |
| 5,620,202 A | * | 4/1997 | Gray et al. ................. 280/735 |
| 5,768,496 A | | 6/1998 | Lidgett et al. ......... 395/183.01 |

FOREIGN PATENT DOCUMENTS

| EP | 0663 324 | 7/1995 |
| GB | 2 310 303 | 8/1997 |

* cited by examiner

Primary Examiner—Thomas G. Black
Assistant Examiner—Brian J. Broadhead
(74) Attorney, Agent, or Firm—Venable LLP; Robert Kinberg

(57) ABSTRACT

A safety arrangement for a motor vehicle, comprises sensor (21, 22) to sense acceleration and a control system to control a triggering circuit (24) which is adapted to actuate or deploy a safety device in the form of an air-bag (27). The control system incorporates a processor (23) which has an input for activating a non-maskable interrupt (NMI) routine (31). An input (30) from the processor (23) which carries a command signal generated by the processor in response to a predetermined output from the sensors (21, 22) is connected an input which activates the NMI routine (31). The routine is designed to determine whether there are hardware and/or software thoughts that may invalidate the command, and to interrupt actuation or deployment of the safety device if any such fault is detected.

12 Claims, 2 Drawing Sheets

VEHICLE SAFETY ARRANGEMENT

Figure 1:
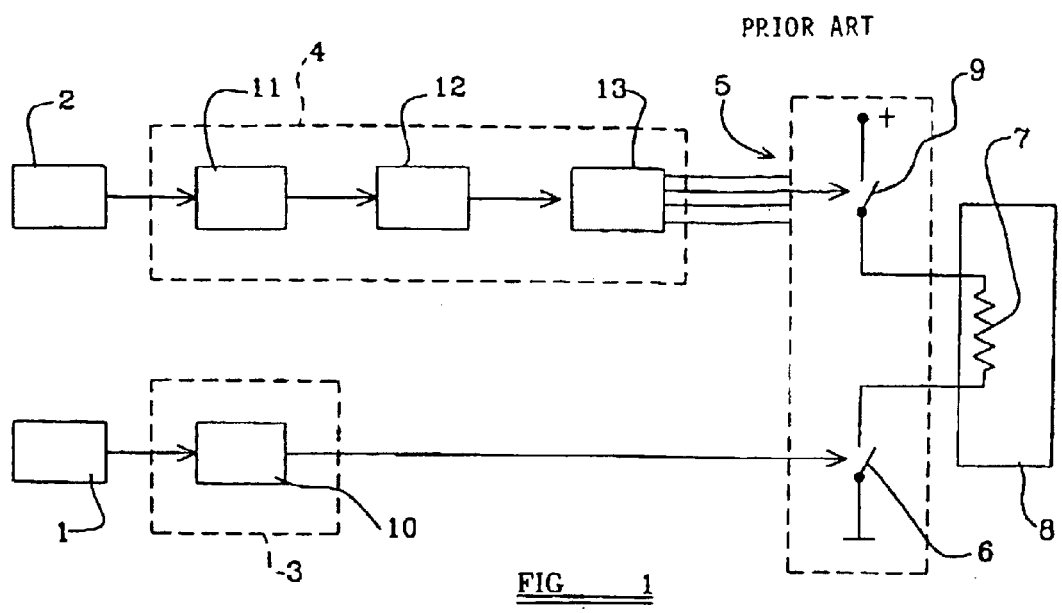

THE PRESENT INVENTION relates to a vehicle safety arrangement, and more particularly relates to a safety arrangement adapted to trigger a safety device that is actuated or deployed in response to a predetermined sensed parameter indicative of an accident situation.

An air-bag is one example of a safety device that is actuated or deployed in response to a predetermined sensed parameter, an air-bag being typically associated with a sensor responsive to deceleration of the vehicle which initiates inflation or deployment of the air-bag. Another example of a safety device that is actuated or deployed is a safety-belt pre-tensioner which, in response to a sensed impact of the vehicle, applies a substantial tension to a safety-belt.

It has been proposed previously to actuate a safety device by an arrangement which incorporates two switches, both switches having to be closed before the safety device is deployed or actuated. In one such arrangement, a first accelerometer, which may be associated with a processor which processes a signal from the accelerometer, generates an output signal which closes a first switch in response to a predetermined deceleration. The deceleration may be a level of deceleration experienced when the vehicle is undergoing "emergency" braking.

A second accelerometer, which again may be associated with a processor adapted to process an output signal from the accelerometer, generates a signal when a second, higher level of deceleration is experienced, or a relatively long period of deceleration is experienced such as that experienced during the initial stages of an impact. An output from this accelerometer is utilised to close the second switch. Output signals must be provided by both of the accelerometers, and associated processors, before both switches are closed the safety device will be deployed.

If a switch is closed due to an error in one of the processors, it is unlikely that the other processor will, at the same time, have an error that will cause an inadvertent deployment of the safety device.

The present invention seeks to provide an improved safety arrangement.

According to this invention there is provided a safety arrangement for a motor vehicle, the safety arrangement for a motor vehicle, the safety arrangement comprising sensor means in the form of at least one sensor adapted to sense a parameter indicative of an accident situation, and a control system controlling a triggering circuit, the control system incorporating at least one processor connected to the sensor means and to the triggering circuit, the processor having an input pin for activating a non-maskable interrupt (NMI) routine, the triggering circuit being adapted to actuate or deploy a safety device in response to a predetermined command generated by the processor in response to a predetermined output from the sensor means, said command generated by the processor creating an input to the said input pin of the processor to start said NMI routine, said NMI routine serving to determine whether there are hardware and/or software faults that may invalidate the command, and to interrupt actuation or deployment of the safety device if any such fault is detected.

Thus, even though only one processor is used, there is only a very slight risk that the safety device will be activated inadvertently.

A "non-maskable interrupt" (NMI) routine is a routine that immediately interrupts any routine or process running in the processor and which cannot itself be interrupted or dis-activated by any other routine. A non-maskable interrupt routine may be dictated by the configuration of the hardware within an appropriate portion of the processor, this configuration being such that the NMI routine itself cannot be interrupted once it has commenced. By selecting the hardware configuration of this portion of the processor appropriately, the precise nature of the NMI routine can be designed so that the routine performs one or more desired functions.

The triggering circuit that forms a part of the invention may be constituted by an application specific integrated circuit which may incorporate two switches. The arrangement may be such that both switches have to be closed before the safety device can be actuated or deployed.

Preferably the sensor comprises at least one accelerometer.

Conveniently the sensor comprises a first accelerometer and a second accelerometer.

Preferably, there are two separate connections between the processor and the means to deploy the safety device, the safety device only being actuated or deployed if appropriate signals are provided on both said connections.

In one embodiment the processor is adapted to form a safeing algorithm to generate a signal indicating the possibility of an accident, and has means to perform a crash algorithm adapted to provide a signal indicating that an accident has occurred.

Conveniently one connection is provided to send high level commands comprising a plurality of digital words with the other connection sending a low level command.

Preferably one of the connections is connected to said pin.

Conveniently the second connection which provides a low level command is the connection connected to said pin.

Preferably both the low level and the high level connections are controlled by the crash algorithm, a terminal command on the high level connection being sent only after the said non-maskable interrupt routine has been completed.

Figure 2:
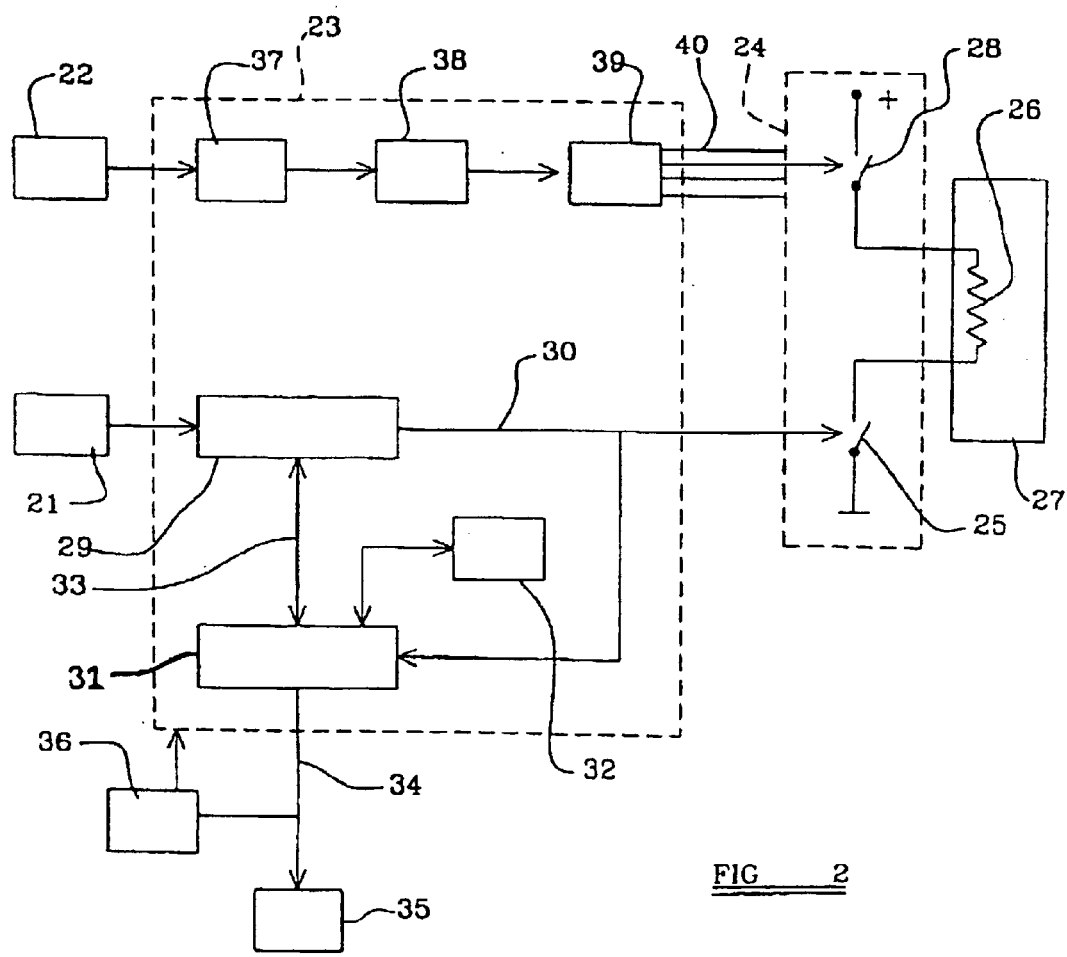
Figure 3:
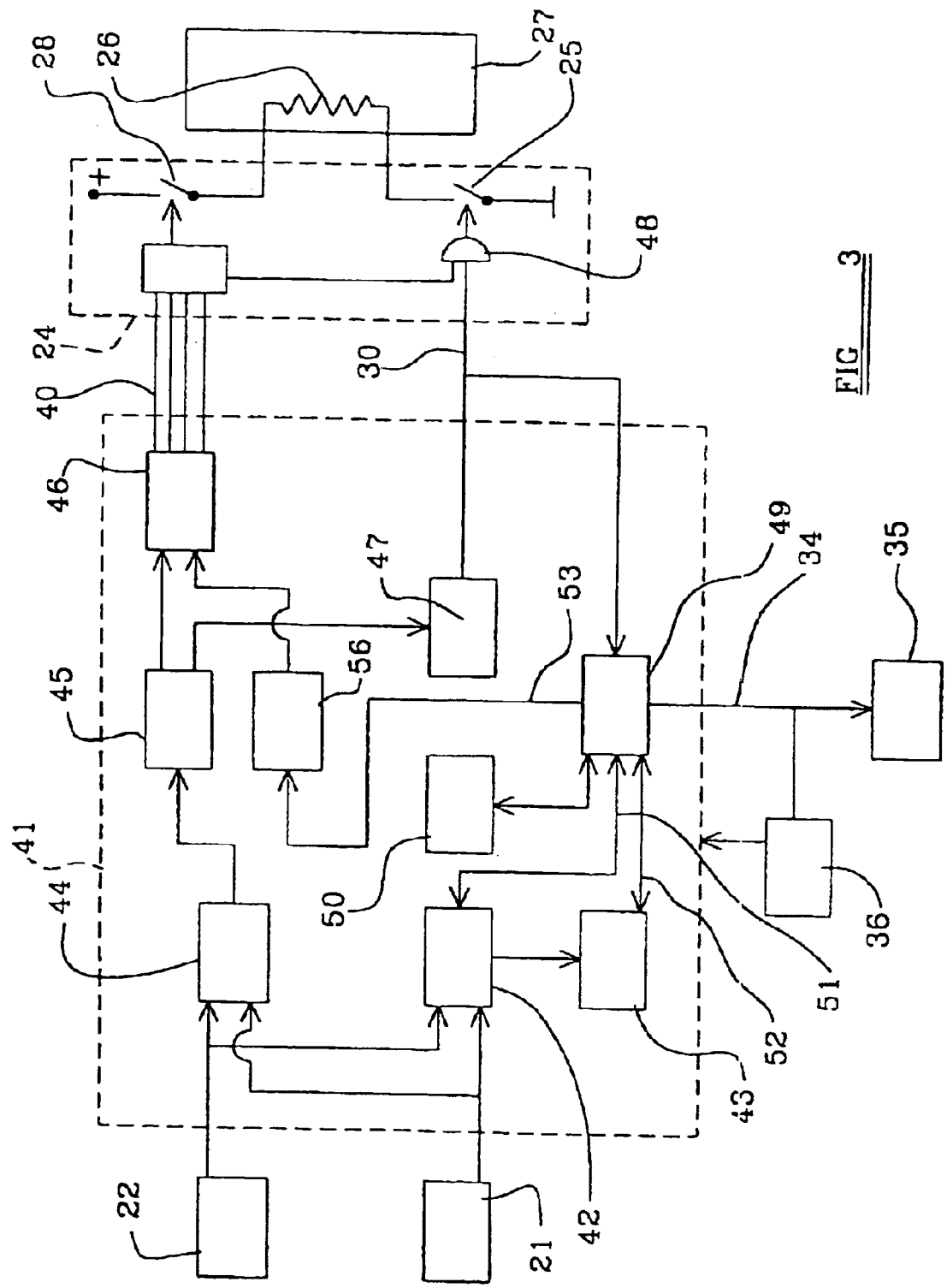

In order that the invention may be more readily understood, and so that further features thereof may be appreciated, the invention will now be described, by way of example, with reference to the accompanying drawings in which:

FIG. 1 is a block diagram of a prior proposed triggering arrangement for a vehicle safety device, FIG. 2 is a view corresponding to FIG. 1, but illustrating a first embodiment of the invention, and FIG. 3 is a view corresponding to FIG. 1 illustrating a second embodiment of the invention.

Referring initially to FIG. 1, an active safety device in a motor vehicle comprises sensors in the form of a first accelerometer 1 and a second accelerometer 2, which are associated with a first micro-processor 3, which is connected to the first accelerometer, and a second micro-processor 4 which is connected to the second accelerometer. The two micro-processors 3, 4 have outputs connected to an application specific integrated circuit 5. The integrated circuit incorporates a first normally open switch 6 adapted to be closed in response to a signal from the first micro-processor 3. The switch 6 is in a series circuit which includes a resistive squib 7 mounted within an air-bag 8, and a second switch 9 on the application specific integrated circuit. The switch 9 is adapted to be closed in response to a signal from the second micro-processor 4.

When both the switch 6 and the switch 9 are closed, a current flows through the resistor 7 which ignites a gas generating pyrotechnic material, initiating deployment of the air-bag 8.

The first micro-processor 3 is adapted to perform a "safeing algorithm" on the output from the first accelerometer 1. The safeing algorithm determines when the sensed acceleration or deceleration is within predetermined limits, these limits being equivalent to very heavy or "emergency" braking. If the vehicle decelerates in this manner, the safeing algorithm generates an output signal which effectively closes the switch 6. If the vehicle does not decelerate the switch stays open and the resistor 7 is isolated.

The second micro-processor 4 carries out an algorithm termed a "crash algorithm" on the output from the second accelerometer 2. The crash algorithm is adapted to generate an output signal whenever a deceleration indicative that a physical impact has occurred on the vehicle is experienced. The output from the crash algorithm 11 passes to a fire order circuit 12. The first order circuit 12 provides an output to a serial peripheral interface 13 which is connected by means of a bus to the application specific integrated circuit 5. An output from the serial peripheral interface 13 closes the switch 9.

The disadvantage of the embodiment of FIG. 1 is the expense of two micro-processors.

FIG. 2 illustrates an embodiment of the invention in which a single micro-processor is utilised. However, as will be explained, the single micro-processor is provided with means which check the operation of the micro-processor as an integral step in the deployment of an air-bag.

Referring to FIG. 2 the illustrated arrangement incorporates a first accelerometer 21. This accelerometer may be a relatively cheap accelerometer with only a relatively low accuracy. The apparatus also includes a second accelerometer 22. Typically this accelerometer is an accelerometer having high accuracy. Both of the accelerometers are connected to a single micro-processor 23. The micro-processor 23 is provided with outputs connected to a triggering circuit in the form of an application specific integrated circuit 24 for actuating or deploying the safety device in response to a predetermined command. As will be described the application specific integrated circuit incorporates a first switch 25 which is connected in series with a resistor 26 contained within the air-bag unit 27 which incorporates an air-bag and a gas generator, and a second switch 28 which is mounted on the application specific integrate circuit 24. As in the embodiment described above, when both of the switches 25 and 28 are closed, an electric current flows through the resistor 26 which initiates deployment of the air-bag 27.

The output from the accelerometer 21 is connected to a portion 29 of the micro-processor 23 which conducts a safeing algorithm. In the described embodiment the safeing algorithm is caused to run every 500 $\mu$s. The duration of the safeing algorithm is approximately 40 $\mu$s. When the acceleration sensed by the accelerometer 1 is below a predetermined threshold, equivalent to ordinary driving conditions, there is no output from the portion 29 which conducts the safeing algorithm. However, if a severe deceleration is sensed equivalent to "emergency" braking, an output is provided, when the safeing algorithm has run, on line 30. The output may be a pulse having a duration of, for example, 150 ms. The line 30 is connected to the switch 25 to close the switch 25. The air-bag is thus prepared for deployment since, once the switch 25 has been closed, only the switch 28 need be closed to effect fill deployment of the air-bag.

The line 30 is, however, also connected to a non-maskable-interrupt input pin present on the micro-processor 23 which leads to a hardware portion 31 of the micro-processor adapted to perform a non-maskable-interrupt routine (an NMI routine). The portion 31 is configured by hardware to perform a predetermined NMI routine. When a pulse is received by the portion 31 adapted to perform the NMI routine from the line 30, immediately the running routine of the processor is interrupted and the portion 31 will effect a predetermined diagnostic routine checking the hardware and software of the micro-processor 23 Thus, for example, the NMI routine will check different hardware potentials represented by hardware 32, and will also check, as indicated by the double headed arrow 33, the software of die safeing algorithm. Because it is dictated by the configuration of the hardware within the portion 31, the NMI routine cannot itself be interrupted By selecting the hardware configuration of the portion 31, the precise nature of the NMI routine can be designed appropriately.

If the NMI routine carried out by portion 31 determines an error, an output is provided on line 34 which actuates an alarm 35, which may be a visual alarm, and which also re-sets the micro-processor 36. The triggering procedure is thus interrupted, but may recommence if an appropriate acceleration is again detected.

However, if the NMI routine carried out by the portion 31 does not determine any errors, then the micro-processor is permitted to resume its ordinary operation. It is envisaged that the NMI routine will have a duration of approximately 15 $\mu$s.

The output from the accelerometer 22 is provided to a portion 37 of the micro-processor 23 which carries out a crash algorithm. The crash algorithm is carried out every 500 $\mu$s, and has a duration of 150 $\mu$s or more. If the crash algorithm determines an acceleration or deceleration equivalent to that experienced during an impact, an output is generated which is passed to a fire order signal generator 38. The fire order signal generator 38 generates a specific signal which may comprise a plurality of digital words. The output from the fire order signal generator is passed to a serial peripheral interface 39 and is then transferred by means of a bus 40 to the application specific integrated circuit 24, with the result that the switch 28 is closed which, as mentioned above, leads immediately to deployment of the air-bag. It is to be noted that, because the output pulse from the safeing algorithm is 150 ms of duration, the signal from the fire order signal generator 38 will be received by the application specific integrated circuit whilst the switch 25 is still closed.

It is to be appreciated that in the embodiment described above, there are two connections between the micro-processor and the actual triggering arrangement as constituted by the application specific integrated circuit with the connection constituted by line 30 carrying low level commands in the form of a simple pulse, while the other connection, in the form of the bus 40, sends high level commands in the form of a plurality of digital words.

FIG. 3 illustrates a second embodiment of the invention in which a differently programmed micro-processor 41 is utilised. The micro-processor 41 is used with exterior components which are generally the same as the components described in FIG. 2, (although there is now AND gate on the application specific integrated circuit 24) and the same reference numerals will be used to identify the same components. These components will not be re-described in detail at this time.

In the micro-processor 41 of FIG. 3, there is a portion 42 adapted to perform a safeing algorithm, and this portion 42 is adapted to receive signals both from the first relatively inexpensive accelerometer 21 and from the accurate accelerometer 22. The safeing algorithm is again performed at regular intervals, the safeing algorithm thus being performed typically every 500 $\mu$s and having a duration of 40 $\mu$s. The safeing algorithm, whenever it is run, reaches a conclusion that either an acceleration exists which is "normal", or an acceleration exists which is above a predetermined threshold and which indicates that an accident may occur. The conclusion of the safeing algorithm is stored within a memory 43. Thus the memory 43 at all times carries a value which either indicates that the vehicle is undergoing "normal" acceleration, or which carries a value indicating that the vehicle is undergoing acceleration indicative that an accident may arise.

The micro-processor 41 includes a portion 44 adapted to conduct a crash algorithm. The crash algorithm is carried out at regular intervals, for example every 500 $\mu$s and has a duration of 150 $\mu$s or more. The portion 44 adapted to conduct the crash algorithm is connected to receive signals from both the first accelerometer 21 and from the second accelerometer 22.

The output of the portion 44 of the micro-processor 41 which carries out the crash algorithm is connected to a first fire order generator 45. Thus, if the acceleration sensed is equivalent to that experienced during an accident, a signal is passed to the fire order generator 45 which generates a fire order signal. The fire order signal may comprise a plurality of digital words, and the fire order signal is forwarded as one input to the serial peripheral interface 46 which is connected to the bus 40 as described above. One of the plurality of digital words serves top open or "enable" the bus 40. Another of the plurality of words serves to close the upper switch 28.

When the first fire order generator 45 generates the output signal which is forwarded to the serial peripheral interface 46, a further output signal is generated which is passed to an enabling signal generator 47 which generates a pulse of approximately 150 ms duration which is applied to the line 30. The line 30 is connected to one terminal of an AND gate 48, the output of which is connected to close the lower switch 25. The line 30 is also connected to a non-maskable interrupt pin of the micro-processor 41, and the pulse generated by the enable signal generator 47 is thus transferred to a portion 49 of the micro-processor adapted to perform the NMI routine. During the NMI routine, which has a duration of approximately 15 $\mu$s, the hardware 50 of the micro-processor is checked, and the software of the micro-processor, as indicated for example by the double headed line 51, is also checked. Additionally, the content of the memory 43 is checked, as indicated by the double headed line 53.

If the NMI routine determines that an error exists, then an output is provided on the line 34 which activates the alarm 35 and the re-set 36 as in the previously described embodiment.

If the NMI routine determines that the hardware and software are in a satisfactory condition, and if the NMI routine determines that the value within the memory 43 is indicative of a situation where it is likely that an accident may occur, then the micro-processor is permitted to continue operating. Then an output signal is provided on the line 53 which is connected to activate a second fire order generator 56. The second fire order generator 56 gives an output signal which is provided to the serial peripheral inter-face 46. This signal, which may be one digital word, is passed by the bus 40 to the application specific integrated circuit 26 where the signal is applied as a second input to the AND gate 48. The AND gate 48 thus passes a signal to close the lower switch 25. The air-bag 27 is thus deployed.

Whilst the invention has been described with specific reference to air-bags, the invention may also be used with other active safety devices.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A safety arrangement for a motor vehicle, the safety arrangement comprising sensor means in the form of at least one sensor adapted to sense a parameter indicative of an accident situation, and a control system controlling a triggering circuit, the control system incorporating at least one processor connected to the sensor means and to the triggering circuit, the processor having an input pin for activating a non-maskable interrupt (NMI) routine, the triggering circuit being adapted to actuate or deploy a safety device in response to a predetermined command generated by the processor in response to a predetermined output from the sensor means, said command generated by the processor creating an input to the said input pin of the processor to start said NMI routine, said NMI routine serving to determine whether there are hardware and/or software faults that may invalidate the command, and to interrupt actuation or deployment of the safety device if any such fault is detected.

2. An arrangement according to claim 1 wherein the sensor comprises at least one accelerometer.

3. An arrangement according to claim 2 wherein the sensor comprises a first accelerometer and a second accelerometer.

4. An arrangement according to claim 1, wherein there are two separate connections between the processor and the triggering circuit so that a safety device will only be actuated or deployed if appropriate signals are provided on both said connections.

5. An arrangement according to claim 4, wherein one of the connections is connected to said input pin.

6. An arrangement according to claim 4 wherein one connection is provided to send high level commands comprising a plurality of digital words with the other connection sending a low level command.

7. An arrangement according to claim 6, herein one of the connection is connected to said input pin.

8. An arrangement according to claim 7, wherein the second connection which provides a low level command is the connection connected to the said input pin.

9. An arrangement according to claim 6, wherein the micro-processor is adapted to form a safeing algorithm to generate a signal indicating the possibility of an accident, and means to perform a crash algorithm adapted to provide a signal indicating that an accident has occurred.

10. An arrangement according to claim 9, wherein both the low level and the high level connections are controlled by the crash algorithm, a terminal command on the high level connection being sent only after the said non-maskable interrupt routine has been completed.

11. An arrangement according to claim 1, wherein the processor is adapted to perform a safeing algorithm to generate a signal indicating the possibility of an accident, and has means to perform a crash algorithm adapted to provide a signal indicating that an accident has occurred.

12. An arrangement according to claim 1, forming a combination with the safety device.

* * * * *